United States Patent [19]

Torikoshi et al.

[11] Patent Number: 5,436,614
[45] Date of Patent: Jul. 25, 1995

[54] THERMAL ANALOG FIRE DETECTOR

[75] Inventors: Yasuo Torikoshi, Kawasaki;
Hiromitsu Ishii, Chiba, both of Japan

[73] Assignee: Hochiki Kabushiki Kaisha, Tokyo, Japan

[21] Appl. No.: 87,502

[22] Filed: Jul. 2, 1993

[30] Foreign Application Priority Data

Jul. 3, 1992 [JP] Japan .................................. 4-176309

[51] Int. Cl.$^6$ ................................................ G08B 17/00
[52] U.S. Cl. ........................................ 340/584; 340/595
[58] Field of Search ............... 340/589, 584, 587, 595, 340/510; 307/130

[56] References Cited

U.S. PATENT DOCUMENTS

| | | | |
|---|---|---|---|
| 4,219,803 | 8/1980 | Kuwabara et al. | 340/584 |
| 4,322,725 | 3/1982 | Annetts | 340/595 |
| 4,555,695 | 11/1985 | Machida et al. | 340/584 |
| 5,140,302 | 8/1992 | Hara et al. | 340/584 |

Primary Examiner—Brent Swarthout
Assistant Examiner—Benjamin C. Lee
Attorney, Agent, or Firm—Max Fogiel

[57] ABSTRACT

A thermal analog fire detector which is excellent in measurement precision and resolution in both the high and low temperature ranges and which has a wide range of measuring temperatures. A constant voltage E from a constant voltage circuit is supplied to a CPU, an A/D converter and a constant current circuit. The constant current circuit is connected in series to a thermistor. The constant current circuit is constructed to supply a constant current, the value of which being variable in a plurality of stages, to the thermistor controlled by the CPU. The CPU switches the constant current of the constant current circuit according to the measured temperature data. A voltage V across the thermistor is converted into digital data by the A/D converter, and then the converted data is supplied to the CPU.

6 Claims, 7 Drawing Sheets (a)

(b)

$R = R_o \, Exp\, \beta \, (\frac{1}{T} - \frac{1}{T_o})$ $\beta$ : CONSTANT PECULIAR TO THERMISTOR
$R_o$ : RESISTANCE WHEN TEMPERATURE IS $T_o$

THERMAL ANALOG FIRE DETECTOR

BACKGROUND OF THE INVENTION

1. Field of the Invention

The present invention relates to a thermal analog fire detector which detects the temperature of the atmosphere by means of a temperature-sensitive resistance element having a variable resistance according to the temperature and which sends the detected temperature information to a receiver.

2. Description of the Related Art

A thermistor is known as a temperature-sensitive resistance element of this type. Such a thermistor is mainly classified into the following two types. One of them is an NTC thermistor in which electrical resistance decreases exponentially as the temperature increases, as shown in FIG. 8. The other one is a PTC thermistor having a positive temperature coefficient. The NTC thermistor is generally used.

When such a thermistor is used for a thermal analog fire detector, the thermistor (variable resistance TH) and the fixed resistor R are connected in series to each other, and the reference voltage E is divided, as illustrated in FIG. 9. The voltage across the fixed resistor R obtained by the following formula is detected:

$$V\{=R \cdot E/(R+TH)\}$$

Thus, the temperature of the atmosphere can be detected.

As is understood from the foregoing description, in a conventional thermal analog fire detector, the temperature of the atmosphere is measured by the following operation: a thermistor in which electrical resistance varies exponentially relative to the temperature and the fixed resistor R are connected in series to each other, and the reference voltage E is divided. Thus, as shown in FIG. 10, when the fixed resistor R having a greater resistance is selected, the voltage has a small rate of change in a high temperature range, thus lowering measurement precision and resolution. On the other hand, when the resistor R having a smaller resistance is selected, the voltage has a small rate of change in a low temperature range, and measurement precision and resolution are also lowered. As described above, a conventional thermal analog fire detector disadvantageously has low measurement precision and resolution both in high and low temperature ranges. This is particularly problematic for a fire detector because it is required to measure the voltage in a high temperature range with high precision.

In order to overcome such a drawback, the fixed resistor R having an intermediate resistance may be selected and the linear temperature region may be utilized. However, this narrows the range of measuring temperatures which generally falls between $-20°$ C.$-100°$ C. Thus, the fixed resistor having an intermediate resistance cannot cope with such a range.

Also, since the temperature is measured by the with the divided voltages as stated above, the current consumption increases at a high temperature. Thus, the durability of the parts of the peripheral circuit must be taken into account.

Further, a power source is generally supplied to a fire detector from a receiver. Hence, the receiver is usually provided with a battery in case of power failure. Accordingly, a battery having a great capacity is required, and thus a device becomes expensive and the number of detectors which can be connected to the receiver is restricted.

A system for measuring temperatures using such as a thermistor disclosed in U.S. Pat. No. 4,322,725 is known. Such a publication also discloses that the thermistor may be applicable to a fire detecting system. However, according to the thermistor, a signal from the thermistor is also divided into AC and DC portions, thereby obtaining a signal in proportion to the temperature of the heat source. Hence, the foregoing problems particular to the conventional thermistor cannot be solved.

SUMMARY OF THE INVENTION

Accordingly, in view of the foregoing problems, an object of the present invention is to provide a thermal analog fire detector in which measurement precision and resolution can be improved both in the high and low temperature ranges and in which the range of measuring temperatures can be widened.

To achieve this object, the present invention provides a thermal analog fire detector sensing a fire by detecting a temperature of the atmosphere based on a voltage determined by resistance of a thermistor; the fire detector comprising: a constant current circuit for supplying the thermistor with a constant current, the value of which being variable in a plurality of stages which have different current values; and control means for dividing the temperatures of the atmosphere into a plurality of ranges beforehand, relating each of the ranges to each of the stages of the constant current, the control means switching, according to the temperature of the atmosphere which is detected based on a voltage across the thermistor, the current value of the constant current based on the relationship between the ranges and the stages of the constant current, thereby varying the current value of the constant current which is applied to the thermistor by the constant current circuit.

The present invention also provides a thermal analog fire detector comprising: a thermistor; a constant current circuit for supplying the thermistor with a constant current, the value of which being variable in a plurality of stages which have different current values; an A/D converter for converting a voltage across the thermistor into digital data; a call-signal receiving circuit for receiving a polling call signal from a receiver; a response signal transmitting circuit for sending back to the receiver a response signal having a signal value which is defined based on the temperature of the atmosphere; and control means for dividing the temperatures of the atmosphere into a plurality of ranges beforehand, relating each of the ranges to each of the stages of the constant current, the control means switching, according to the temperature of the atmosphere which is detected based on a voltage across the thermistor, the current value of the constant current based on the relationship between the ranges and the stages of the constant current, the control means instructing, when the call signal receiving circuit receives the polling call signal from the receiver to itself, the response signal transmitting circuit to transmit to the receiver a response signal in the form of a current value according to the detected temperature of the atmosphere.

The control means may preferably have a table corresponding to each of the temperature ranges beforehand, the tables indicating the relationships between a detected voltage across the thermistor and a response signal value which is defined according to a temperature of the atmosphere to the receiver.

Also, the control means may calculate a response signal value which is transmitted to the receiver, in accordance with the detected temperature of the atmosphere in each of the temperature ranges, and the control means transmits a current to the response signal transmitting circuit, the current instructing the circuit to transmit the response signal.

In addition, the constant current circuit may be a variable resistor connected to both ends of the thermistor in parallel thereto.

According to the above construction of the present invention, the constant current flowing in a temperature-sensitive resistance element can be controlled by stages according to the range of the temperatures of the atmosphere. Thus, measurement precision and resolution can be improved both in the high and low temperature ranges, and the range of measuring temperatures can also be widened. The voltage across the temperature-sensitive resistance element is not measured by utilizing a circuit with the divided voltages shown in FIG. 9, thus preventing an increase in the current consumption.

DESCRIPTION OF THE PREFERRED EMBODIMENTS

Figure 1:
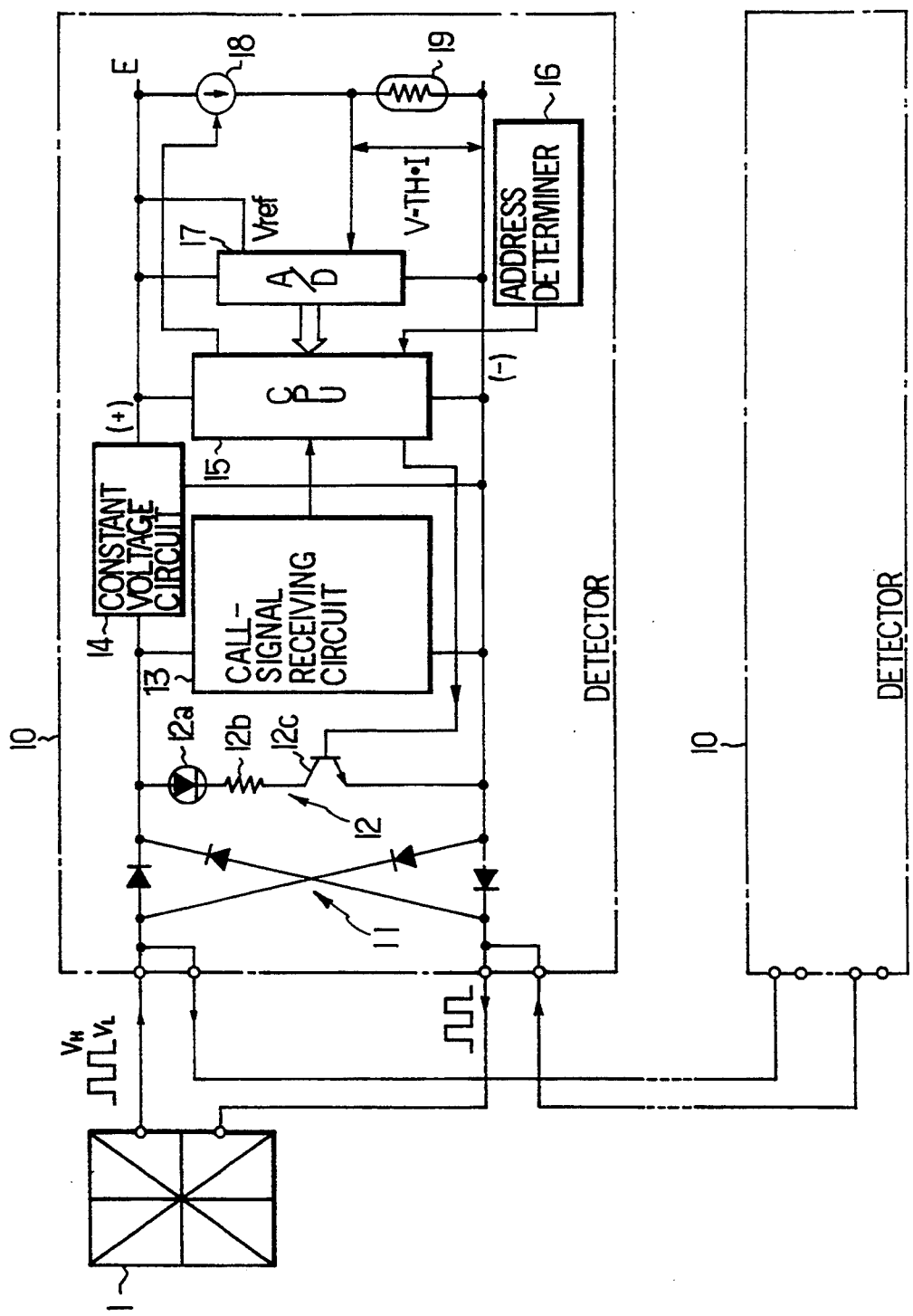
FIG. 1 is a circuit diagram showing one example of a thermal analog fire detector according to the present invention.
Figure 2:
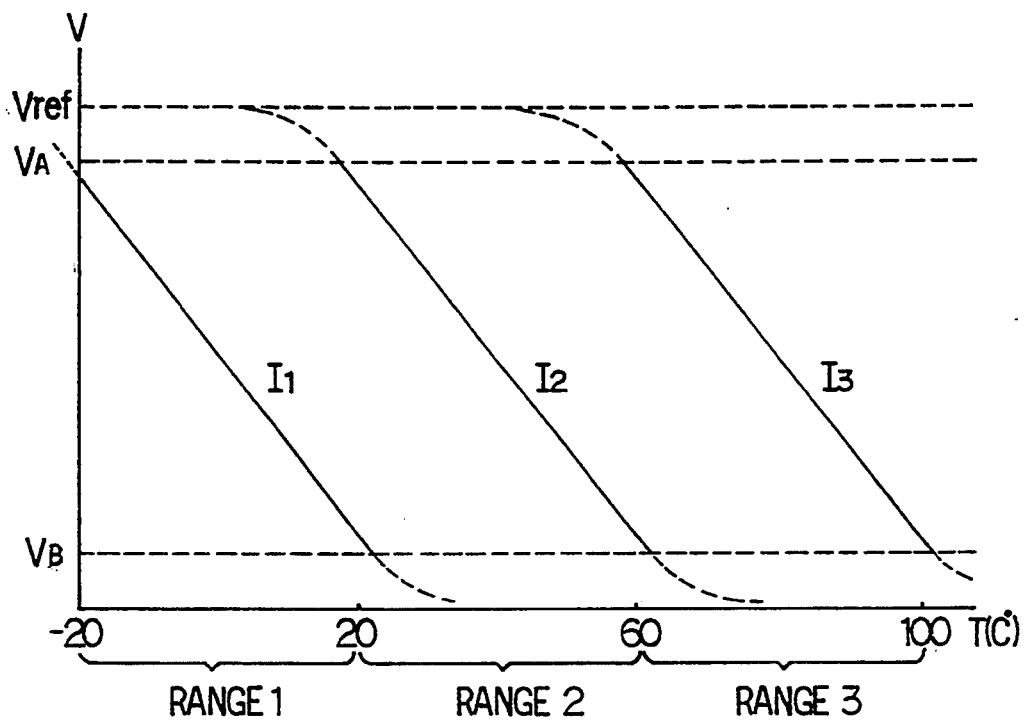
FIG. 2 is a graph indicating the characteristics of the measured temperature of the fire detector shown in FIG. 1.

An embodiment of the present invention will be described with reference to the drawings. FIG. 1 is a circuit diagram showing one example of a thermal analog fire detector according to the present invention. FIG. 2 is a graph indicating the characteristics of the temperatures measured by the fire detector shown in FIG. 1.

A receiver 1 sends a signal obtained by superimposing a voltage VL, for example, 31 V at the low level, on a polling call signal in the form of a voltage VH 39 V at the high level to a detector 10 of this example. The detector 10 uses the voltage VL as the power supply and sends back temperature measuring data or the like in the form of a responding signal in response to the polling call signal having a voltage VH. The receiver 1 and a plurality of fire detectors 10 are connected to each other by two lines.

A signal from the receiver 1 is applied in the form of the power supply voltage of a response signal transmitting circuit 12 and a constant voltage circuit 14 via a diode bridge 11 for coinciding polarities included in the detector 10. A polling call signal is received by a call-signal receiving circuit 13.

The response signal transmitting circuit 12 is formed of a light emitting diode 12a, current limiting resistor thereof 12b, a transistor for transmitting a response signal 12c, and the like. A CPU (central processing unit) 15 compares a polling call signal received by the call-signal receiving circuit 13 with a predetermined address of the detector 10 by way of an address determiner 16 such as a DIP switch or the like. If they are conformed to each other as a result of comparison, the transistor 12c is turned ON or OFF according to the temperature data, thereby returning a response signal to the receiver 1 based on a current value.

The constant voltage E from the constant voltage circuit 14 is supplied to the CPU 15, an A/D converter 17 and a constant current circuit 18. The constant current circuit 18 is connected in series to a thermistor 19 having the resistance TH. It is constructed to supply, for example, the constant current, the value of which being variable in three stages, to the thermistor 19 controlled by the CPU 15. At the same time, the voltage V (=TH·I) on both ends of the thermistor 19 is converted to digital data by the A/D converter 17 and then the converted digital data is supplied to the CPU 15. The A/D converter 17 converts the detected voltage V into digital data so that the digital data indicates its maximum value when the detected voltage is equal to the reference voltage (=E).

Thus, according to the temperature data from the A/D converter 17, the CPU 15 controls the operation such that the constant current circuit 18 applies the 3 different constant currents I1–I3 to the thermistor 19, as illustrated in FIG. 2. Then, the temperatures in the respective 3 temperature ranges are converted into the digital data which indicate their maximum values when they are equal to the reference voltage (Vref). In this example, the temperatures are classified into 3 ranges. For example, if the temperature falls within the temperature range 2, the CPU 15 controls the operation such that the constant current I2 is applied to the thermistor 19, and the voltage detected at this time is converted into digital data by the A/D converter 17 and is supplied to the CPU 15.

In the respective temperature ranges, the CPU 15 has tables indicating the relationship between the detected voltage from the A/D converter 17 and the control current of the transistor for transmitting a response signal 12c. More specifically, the following relationship is defined in each table: the relationship between the detected voltage from the A/D converter 17 and the current value which will be applied to the transistor 12c so that the current value corresponding to the detected value (temperature data) can be sent back to the receiver 1.

Therefore, in order to send back to the receiver the current value in accordance with the detected value, the CPU 15 first determines in which range the current temperature is. That is, the CPU 15 switches the constant current value and monitors whether or not the detected voltage in the range from VA to VB in the respective temperature ranges is outputted. For instance, if the current temperature is 30° C., the voltage ranging from VA to VB is outputted when the constant current value is switched to the value I2 within range 2, and whereby the CPU 15 determines the current temperature is within range 2. Then, the CPU 15 controls the transistor 12c by using the table for range 2. That is, a predetermined current value obtained from the table is applied to the transistor 12c, and thereby the current value corresponding to the detected value is sent back to the receiver. The CPU 15 repeats this operation so as to send back to the receiver the current value corresponding to the temperature by using the table corresponding to the temperature range.

As stated above, in the present invention, the temperature can be measured by selecting the suitable temperature ranges and by utilizing the linear regions of the characteristic curve of the thermistor 19. Also, the dynamic range of the A/D converter 17 is utilized effectively, thus improving measurement precision and resolution. Further, since the voltage V across the thermistor 19 is outputted by utilizing the current I, an increase in current consumption can be avoided.

Figure 3:
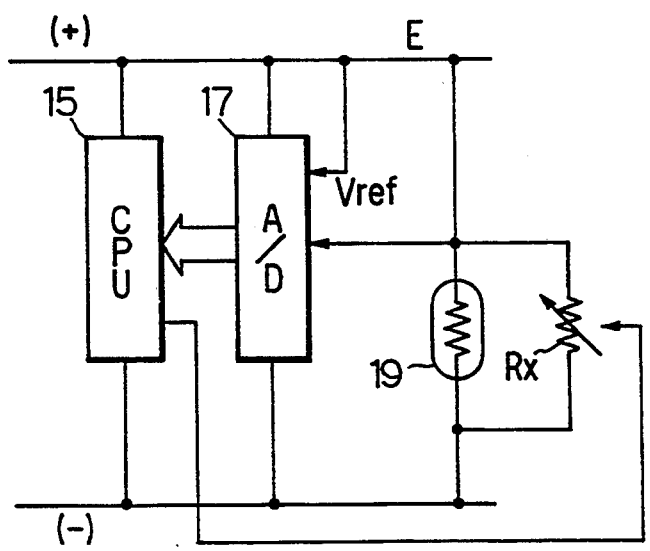
FIG. 3 is a circuit diagram showing one example of a constant current circuit.

Examples of the constant current circuit 18 will now be specifically given. In an example illustrated in FIG. 3, the resistance of variable resistor RX is controlled by the CPU 15, thereby varying the current I flowing in the thermistor 19. Such variable resistor RX is constructed, for example, so that three pairs of series circuits each consisting of a resistor and a switch are connected parallel to each other. The switch is selected to be ON, whereby the current I flowing in the thermistor 19 can be varied in 3 different stages.

Figure 4:
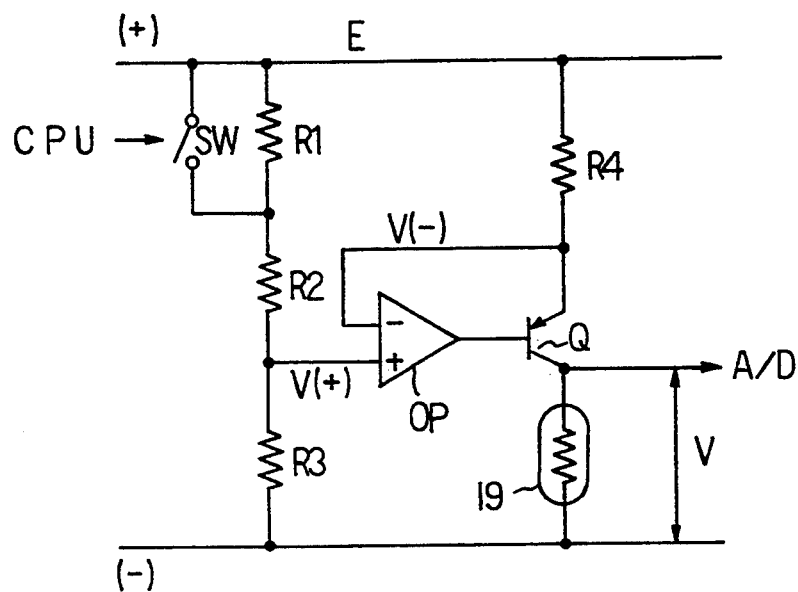
FIG. 4 is a circuit diagram showing another example of the constant current circuit.

Another example is shown in FIG. 4. A switch SW, resistors R1 and R4 are each connected at one end to a positive line. The switch SW and the resistor R1 are each connected at the other end to one end of a resistor R2. The resistor R2 is connected at the other end to a negative line via a resistor R3, and also to a non-inverting input terminal of a differential amplifier OP. The output terminal of the differential amplifier OP is connected to a base of a PNP transistor Q. Further, the resistor R4 is connected at the other end to an inverting input terminal of the differential amplifier OP and to the emitter of the transistor Q, whereas the collector of the transistor Q is connected to the negative line via the thermistor 19.

In such a constant current circuit, the input voltage V(−) of the inverting input terminal of the differential amplifier OP is the same as the input voltage V (+) of the non-inverting input terminal. Thus, when the switch SW bypassing the resistor R1 is OFF, the current I flowing in the thermistor 19 can be expressed by the following formula.

$$I = \{E - (R1+R2)E/(R1+R2+R3)\}/R4 \quad (1)$$

When the switch SW is ON, both ends of the resistor R1 are directly connected, and the current I calculated by leaving out the resistor R1 from the above formula (1) is obtained. Thus, the current I flowing in the thermistor 19 can be varied, and also the temperature can be measured in the two temperature ranges. The two temperature ranges are set such as in the ranges between −20° C.–40° C. and between 40° C.–100° C.

Figure 5:
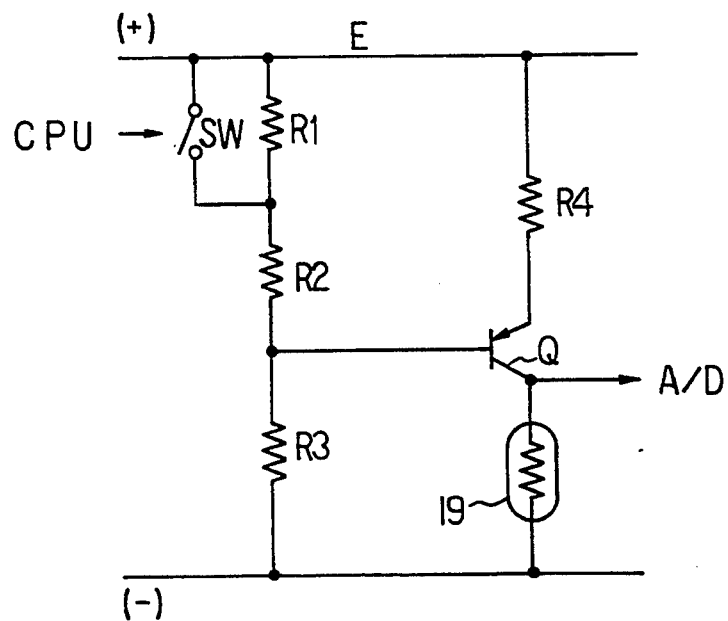
FIG. 5 is a circuit diagram showing another example of the constant current circuit.

In another example is illustrated in FIG. 5, the differential amplifier shown in FIG. 4 is omitted. A contact point between the resistors R2 and R3 is connected to a base of a PNP transistor Q. Likewise, when the switch SW bypassing the resistor R1 is OFF, the current I flowing in the thermistor 19 can be obtained by the foregoing formula (1). On the other hand, when the switch SW is ON, both ends of the resistor R1 are directly connected, and the current I calculated by leaving out the resistor R1 from the foregoing formula (1) is obtained. Thus, the current I flowing in the thermistor 19 can be varied, and the temperature can be measured in the two temperature ranges.

Figure 6:
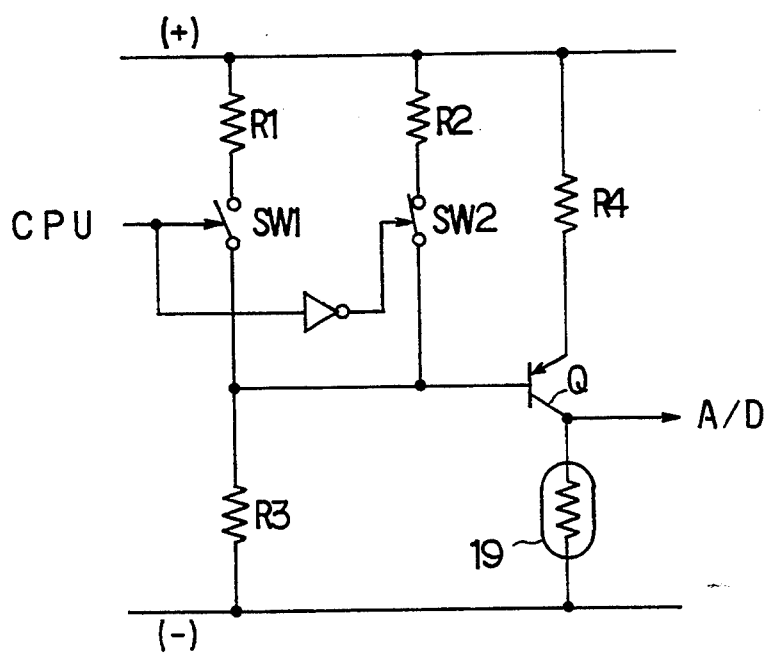
FIG. 6 is a circuit diagram showing another example of the constant current circuit.
Figure 7:
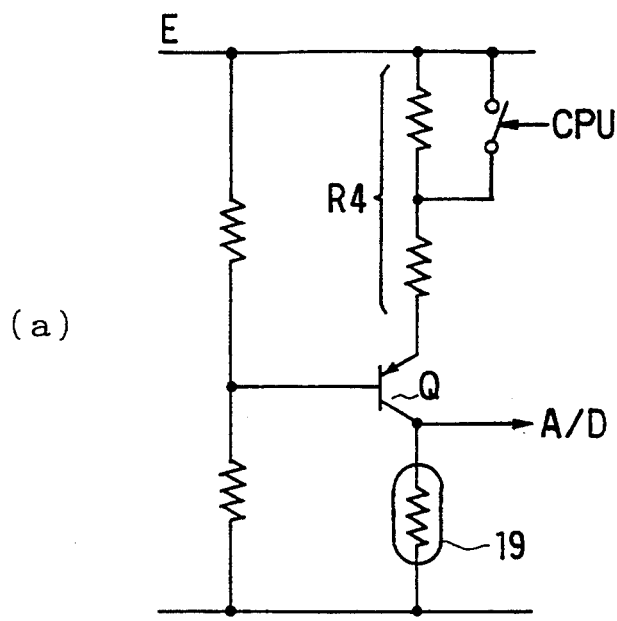
FIG. 7 is a circuit diagram showing another example of the constant current circuit.
Figure 7:
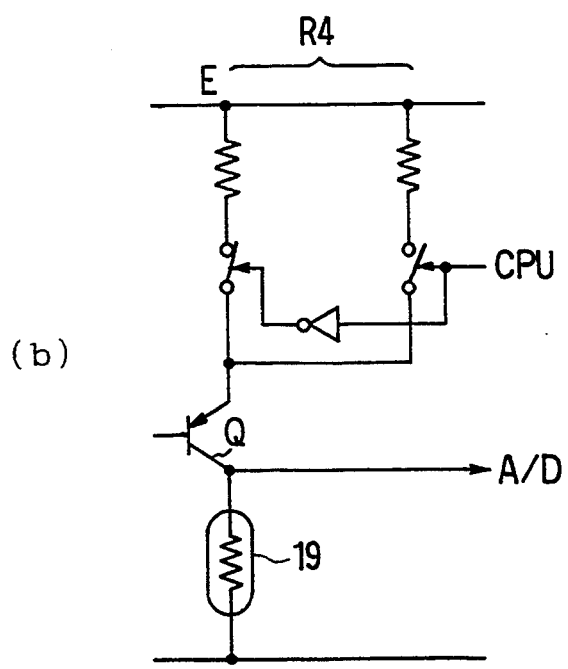
Figure 8:
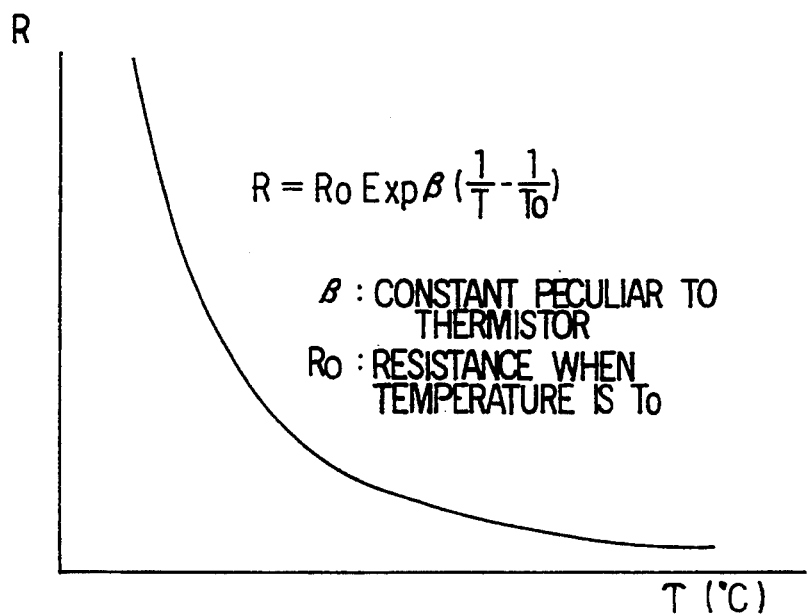
FIG. 8 is a graph indicating the characteristics of a thermistor.
Figure 9:
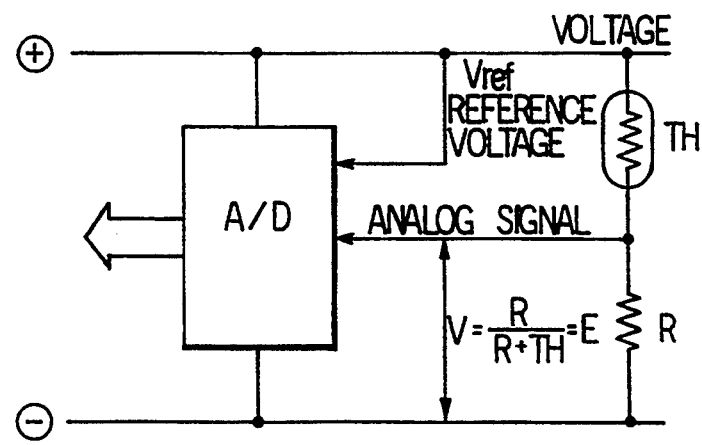
FIG. 9 is a circuit diagram showing a conventional thermal analog fire detector.
Figure 10:
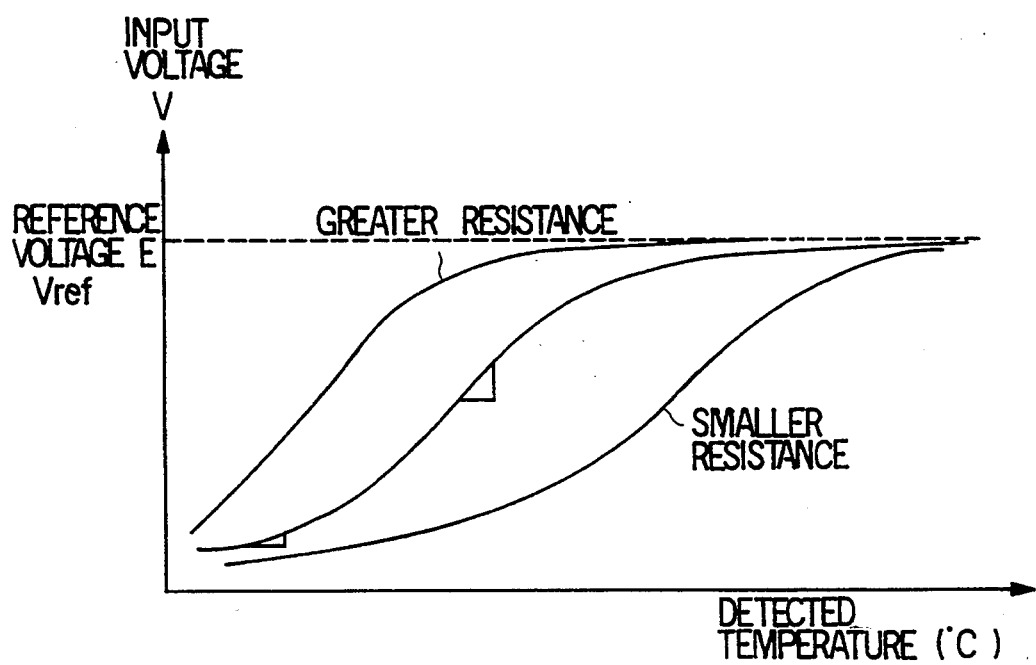
FIG. 10 is a graph indicating the characteristics of the measured temperature of the fire detector shown in FIG. 10.

A circuit shown in FIG. 6 is constructed as follows. The resistors R1 and R2 are each connected at one end to the positive line, and at the other end to the switches SW1 and SW2, respectively. The switches SW1 and SW2 are controlled by the CPU 15 so that one of them is ON and that the other is OFF. The other components of the circuit are similar to those of the circuit in FIG. 4. More specifically, in this circuit, the current I calculated by leaving out either of the resistors R1 or R2 flows selectively in the thermistor 19. Thus, the temperature can be measured in the two temperature ranges. The current I flowing in the thermistor 19 may be varied by varying the resistor R4 connecting in series (FIG. 7(a)) or in parallel (FIG. 7(b)) adjacent to the emitter of the transistor Q as shown in FIG. 7(a)(b).

What is claimed is:

1. A thermal analog fire detector sensing a fire by detecting a temperature of the atmosphere based on a voltage determined by resistance of a thermistor; said fire detector comprising:

a constant current circuit for supplying said thermistor with a constant current, the value of which being variable in a plurality of stages which have different current values; and control means for dividing temperatures of the atmosphere into a plurality of ranges, relating each of said ranges to each of said stages of said constant current according to a predetermined relationship, said control means switching, according to the temperature of the atmosphere which is detected based on said voltage across said thermistor, said current value of said constant current based on said predetermined relationship between said ranges and said stages of said constant current, thereby varying the current value of said constant current which is applied to said thermistor by said constant current circuit.

2. A thermal analog fire detector comprising:

a thermistor;

a constant current circuit for supplying said thermistor with a constant current, the value of which being variable in a plurality of stages which have different current values;

an A/D converter for converting a voltage across said thermistor into digital data;

a call-signal receiving circuit for receiving a polling call signal from a receiver;

a response signal transmitting circuit for sending back to said receiver a response signal having a signal value which is defined based on said digital data of the temperature of the atmosphere; and control means for dividing temperatures of the atmosphere into a plurality of ranges, relating each of said ranges to each of said stages of said constant current according to a predetermined relationship, said control means switching, according to the temperature of the atmosphere which is detected based on said A/D converted voltage across said thermistor, said current value of said constant current based on said relationship between said ranges and said stages of said constant current, said control means instructing, when said call-signal receiving circuit receives said polling call signal from said receiver to itself, said response signal transmitting circuit to transmit to said receiver a response signal in the form of a current value according to the detected temperature of the atmosphere.

3. A thermal analog fire detector set forth in claim 1, wherein said control means has a table corresponding to each of said temperature ranges beforehand, said tables indicating predetermined relationships between a detected voltage across said thermistor and a response signal value which is defined according to a temperature of the atmosphere to said receiver.

4. A thermal analog fire detector set forth in claim 1, wherein said constant current circuit is a variable resistor connected to both ends of said thermistor in parallel thereto.

5. A thermal analog fire detector set forth in claim 1, wherein said control means calculates a response signal value which is transmitted to a receiver, in accordance with the detected temperature of the atmosphere in said temperature ranges, and wherein said control means transmits a signal current to a response signal transmitting circuit, said signal current instructing said response signal transmitting circuit to transmit said response signal.

6. A thermal analog fire detector as defined in claim 2, wherein said A/D converter converts the detected voltage across said thermistor into digital data so that the digital data reaches its maximum value when the detected voltage is equal to a reference voltage.

* * * * *